(12) United States Patent
Costa et al.

(10) Patent No.: US 6,602,343 B1
(45) Date of Patent: Aug. 5, 2003

(54) QUICK SETTING CEMENT WITH LIME AND ALUMINATES

(75) Inventors: Umberto Costa, Bergamo (IT); Lorenzo Barcella, Alzano Lombardo (IT)

(73) Assignee: Italcementi S.p.A., Bergamo (IT)

( * ) Notice: Subject to any disclaimer, the term of this patent is extended or adjusted under 35 U.S.C. 154(b) by 0 days.

(21) Appl. No.: 09/914,808

(22) PCT Filed: Mar. 2, 2000

(86) PCT No.: PCT/EP00/01775

§ 371 (c)(1), (2), (4) Date: Oct. 24, 2001

(87) PCT Pub. No.: WO00/51947

PCT Pub. Date: Sep. 8, 2000

(30) Foreign Application Priority Data

Mar. 2, 1999 (IT) .......................................... MI99A0419

(51) Int. Cl.⁷ .............................. C04B 9/11; C04B 9/12; C04B 2/10
(52) U.S. Cl. ........................ 106/692; 106/693; 106/792; 106/739
(58) Field of Search ................................ 106/692, 693, 106/792, 739

(56) References Cited

U.S. PATENT DOCUMENTS 3,856,540 A * 12/1974 Mizunuma et al. ......... 106/705

FOREIGN PATENT DOCUMENTS

| DE | 2163604 | 10/1973 | ............. C04B/7/02 |
| EP | 0819660 | * 1/1998 | |
| IT | 988018 | 12/1971 | ............. C04B/7/54 |

OTHER PUBLICATIONS

Abstract of JP 09086989, Shunichiro, Sep. 1995.*
Abstract of JP 04305043, Hisanobu, Oct. 1992.*

* cited by examiner

*Primary Examiner*—Elizabeth D. Wood
(74) *Attorney, Agent, or Firm*—Abelman, Frayne & Schwab (57) ABSTRACT

The present invention refers to a hydraulic binder made from Portland clinker containing calcium fluoroaluminate $11CaO.7Al_2O_3.CaF_2$, to which sodium aluminate, lime, and optionally, sodium bicarbonate are added. The added lime has not undergone the formation process of clinker. The cement mix that can be obtained with this binder has a very short hardening time, scarcely influenced by temperature variations during laying operations.

27 Claims, 6 Drawing Sheets

QUICK SETTING CEMENT WITH LIME AND ALUMINATES

FIELD OF THE INVENTION

The present invention refers to a hydraulic binder with a quick setting time for use in cement compositions, comprising a clinker which contains calcium fluoroaluminate $11CaO.7Al_2O_3.CaF_2$, (hereafter abbreviated as $C_{11}A_7f$), sodium aluminate, optionally sodium bicarbonate, and lime which has not undergone the baking process of clinker.

In the present text the following abbreviations are used:

$CaO=C$; $Al_2O_3=A$; $SiO_2=S$; $CaF_2=f$; $Fe_2O_3=F$;
$11CaO.7Al_2O_3.CaF_2=C_{11}A7f$; $12CaO.7Al_2O_3=C_{12}A_7$;
$3CaO.Al_2O_3=C_3A$; $CaO.Al_2O_3=CA$;
$3CaO.SiO_2=C_3S$;
$2CaO.SiO_2=C_2S$; $(2CaO.Fe_2O_3-6CaO.2Al_2O_3.Fe_2O_3)_{ss}=C_4AF$ where ss signifies solid solution
$3CaO.3Al_2O_3.CaSO_4=C_4A_3S$

STATE OF THE ART

For various types of application such as rapid fixing and repairs on concrete and masonry vertical and horizontal surfaces it is important that cement materials having very quick setting time are available. Examples of such applications are: placing of manhole covers in roads, fixing steel brackets, plumbing pipes and hinges, laying dummy wooden and metal frames, laying electrical boxes and sheathing for electrical plants, wooden dowels, sealing of cement conduits, sewers or cisterns, blocking weak water leaks in underground structures, basements and elevator pits.

Further examples of uses are: paving landing runways, covering roofs, mortar or concrete casting in tunnels and subways, lining slopes and slanting grounds and increasing productivity by reducing formworks removal time in plants for the manufacture of concrete products, such as: blocks, pipes, panels, cross beams and structural uprights.

Other uses consist in accelerating the setting and hardening time of mortar and concrete, premixed concrete and cement binders.

Therefore, modified Portland-type binders have been developed, which have faster setting and hardening characteristics than normal Portland cement.

According to the Italian M.D. (Ministerial Decree) dated Aug. 31, 1972 "Norme sui requisiti di accettazione e modalità di prova degli agglomerati cementizi e delle calci idrauliche" (=Regulations for acceptance requirements and test methods for cement agglomerates and hydraulic limes), the quick setting binders must nave a minimum initial setting time greater than 1 minute, final setting time below 30 minutes, determined on standard compounds, and must moreover have a minimum resistance to compressive stress after 7 days of at least 13 MPa. Further specifications regard the content of $SO_3$ (lower than 3,5%), and MgO (lower than 4%).

The "so called" rapid binders are characterized in general by high contents of calcium aluminate. Among the aluminates, $C_{12}A_7$, and in a smaller amount, $C_3A$, hydrate very quickly, while CA hydrates slowly. The rate of hydration can be modified by the presence of salt or chemical products which act as accelerators or retardants.

Various rapid binders are obtained by "clinkerization" of mineral mixes or industrial by-products followed by grinding of the resulting clinker, and addition of additives such as anhydrite. Various types of clinker are known for rapid binders, such as:

a) Clinker enriched in $C_{12}A_7$, the composition thereof falling in the compatibility tetrahedron $C_2S—Cl_2A_7—C_3A—C_4AF$. These types of cements are sold under the name of Prompt Vicat.

b) Clinker containing fluorinated derivatives of $C_{12}A_7$, whose composition falls in the compatibility tetrahedron $C_3S—C_2S—C_{11}A_7f—C_4AF$, like the Regulated Set Cement used in the USA and Giesereibinder in Heidelberg.

c) Clinker containing calcium sulphoaluminate $C_4A_3S$ e $\beta$-$C_2S$. The baking temperature in this case is more critical as compared with clinker a) and b) because the stability range of $C_4A_3S$ is rather narrow: 1150 and 1350° C.

d) Mixes of Portland cement and aluminous cement.

The b) types of clinker that result in improved products resistance characteristics due to the presence of $C_3S$, and in addition permit recycling (by incorporating into the clinker) of alumina bearing scoria, which is sold at inexpensive market rates. Fluoroaluminate cements were developed in the early 70's (Italian patent no. 37815 A/69 and Italian patent no. 988018).

Similar cement compositions were successively developed in Japan, and sold under the name Jet Cement. DE 2163604 claims clinkers containing from 40% to 60% of $C_{11}A_7f$ and from 30% to 50% of $C_3S$.

Clinker containing fluoroaluminate can be used advantageously in preparing quick setting binders, nonetheless, as can be deduced from the results shown in DE 2163604, in order to achieve satisfactory resistance to compressive stress, elevated contents of $C_{11}A_7f$ are required, equal to at least 40% in weight of the clinker. This is an unquestionable drawback, given the relevant increase in the costs of the final product due to the high quantity of alumina ($Al_2O_3$) and calcium fluoride necessary for the preparation of the clinker.

The European Patent Application EP-A-819660 described a quick hardening cement wherein the clinker contains calcium fluoroaluminate and lime which has not undergone the baking process of the clinker ("raw lime"). The use of this highly reactive type of lime allows to obtain a quick setting cement without the use of high quantities of $C_{11}A_7f$.

Nonetheless, the setting times of cements described in EP-A-819660, vary considerably with the ambient temperature at which the cement is used. Thus, while the hardening values at moderate or elevated ambient temperatures are good, those at low temperatures are less satisfactory. The reduction in hardening rate is an evident disadvantage, above all in the event of its use in countries with cold climates, or during cold seasons.

Differences in hardening times due to temperature makes it necessary to modify the cement composition according to seasonal climate, with the obvious disadvantage that working with the product is more complex and less flexible.

In consideration of the drawbacks stated above, the need is felt for new quicker-hardening concretes, particularly for use at cold temperatures.

In addition, it is desirable to obtain quick-hardening cements having an increased constancy in hardening times throughout the entire temperature range in which it is used.

SUMMARY

Object of the present invention is a hydraulic binder for cement compositions comprising a clinker containing calcium fluoroaluminate $11CaO.7Al_2O_3.CaF_2$, sodium aluminate, lime added to clinker after baking, and optionally sodium bicarbonate. Such binder permits the formation of cement compositions that have a very quick hardening time at both high and low temperatures.

These cement compositions have the further advantage of an elevated setting time stability throughout the temperature range 5° C.–35° C.

The binder of the invention is prepared by grinding the above mentioned ingredients together with clinker, or by grinding them separately and then mixing them with the previously ground clinker.

The invention comprises, in addition, premixed dry compositions containing said binder that are suitable for preparing quick-setting cement mixes, such as mortar and concrete, and their use in the building industry.

DESCRIPTION OF THE FIGURES

FIGS. 1a, 1b, 1c

Results of the setting test for sprayable concrete compositions containing the binder object of the present invention and sodium silicate with a silica/$Na_2O$ molar ratio=3.5.

FIGS. 2a, 2b, 2c

Results of the setting test for sprayable concrete compositions containing the binder object of the present invention and Gecedral F 200.

DETAILED DESCRIPTION OF THE INVENTION

The present invention refers to regards a hydraulic binder for cement compositions comprising: a clinker containing calcium fluoroaluminate ($C_{11}A_7f$), sodium aluminate, and lime added to previously baked clinker. "Hydraulic binder" refers to a pulverized cement material in its solid dry state, that when mixed with water forms a malleable mix capable of setting and hardening.

The clinker contained in the aforementioned hydraulic binder is obtained by submitting to a baking process ("clinkerization"): calcium fluoroaluminate [$11CaO.7Al_2O_3.CaF_2$] with at least one source of lime, at least one source of alumina, at least one source of iron, at least one source of fluoride and at least one source of silica.

Typical sources of lime are loam or limestone, which contain for example about 35–55% of CaO. Typical sources of alumina are bauxite, that has an alumina content of about 60–90%, and scoria residue from the aluminium metallurgy. Typical sources of fluoride are fluorites and the so called "fluorite biscuits" with a percentage of $CaF_2$ from 40% to 60%. Typical sources of silica are loam or argil and silica sands.

The mix of raw materials to be submitted to "clinkerization" have typically a content of $Al_2O_3$ between 3% and 10% by weight; and a content of CaO between 35% and 45% by weight. In addition, it may have a content of $SiO_2$ between 10% and 15% by weight.

Materials to be submitted to "clinkerization", preferably in a finely subdivided form, are mixed until homogenized and submitted to baking in conventional kilins. As an alternative, it is possible to add the appropriate quantities of bauxite and fluorite to a conventional flour regularly used for Portland clinker. Other methods known from the previous techniques may be used for the preparation of clinker.

Baking the clinker is generally done at a temperature between about 1275° C. and 1440° C., preferably between 1300° and 1350° C.

The clinker obtained in this way contains the ingredients typical of Portland cement clinker as halite ($C_3S$), belite ($C_2S$) and calcium aluminium ferrite ($C_4AF$).

The clinker may contain limited variable quantities of free lime (CaO), derived from an incomplete transformation of the raw materials used in its preparation. The clinker preferably comprises:

from 12% to 18% by weight of $C_{11}A_7f$;
from 40% to 45% by weight of $C_3S$;
from 25% to 30% by weight of $C_2S$;
from 6% to 8% by weight of $C_4AF$.

Composition data shown above are referred to the potential calculation scheme below:

$C_4AF = 3.04 Fe_2O_3$ $$C_{11}A_7f = \frac{Al_2O_3 - (C_4AF \times 0.2098)}{0.5066}$$

$CaO_{res} = CaO_{tot} - 0.4616\ C_4AF - 0.4379\ C_{11}A_7F - CaO_{lib} - 0.7 SO_3$ $C_3S = 4.07 CaO_{rest} - 7.6\ SiO_2$ $C_2S = 8.6 SiO_2 - 3.07\ CaO_{rest}$ where rest=remainder; lib=free; tot.=total.

The hydraulic binder, object of the present invention, is obtained by adding to the above mentioned clinker: (i) lime, (ii) sodium aluminate (iii) sodium bicarbonate and (iv) other appropriate cement additives (the components (iii) and (iv) being optional). With respect to the hydraulic binder obtained in this way, the clinker accounts for at least 70%, and more preferably, at least 93% by weight.

The lime added to the clinker for the preparation of the hydraulic binder according to the present invention is "raw" lime, which has not undergone any process of "clinkerization". Thus, it is different from the "overbaked" lime, and gives to the binder according to the present invention advantageous properties in terms of resistance to compressive stress and setting time, which are not obtainable with "overbaked" lime.

Lime that has undergone baking, in particular at temperatures above 850°–900° C., is modified and becomes scarcely reactive, and in the water cooling process, which takes place during the preparation of the cement composition, hydrates slowly. In addition, when present beyond certain limits, it causes instability for the hardened mix, mortar and concrete.

Thus, the raw lime added to clinker after the baking process is clearly distinguishable from the lime present in the binders and derived from the clinker. This type of lime does not create any problems of instability in the hardened cement compositions.

The lime is preferably added to the clinker in quantities of at least 1%, for example between 1% and 8% by weight with respect to the total weight of the solid binders, and more preferably between 3% and 6%, or typically 4%.

Sodium aluminate is preferably added as sodium metaaluminate, or as double salt such as sodium aluminosulfate, or sodium aluminosilicate, and is contained in the binder in a percentage in weight between 0.01% and 0.5%.

Sodium aluminate is responsible for the quicker setting at low temperatures and for the elevated setting time stability at temperature ranging from 5 to 35° C.

According to a particular embodiment of the present invention, sodium bicarbonate may be further added to the clinker. This product is present in a percentage from 0.1% to 1% by weight with respect to the weight of the binder.

The addition of bicarbonate produces an amplification in the effects of the stabilization described above, as well as an improved preservation of mechanical resistance values of the composition when laid.

In addition to the components mentioned above, the cement binder according to the present invention may contain other cement additives, e.g. sources of calcium sulphates, which are added to clinker in one of the manners described above for lime, aluminate, and bicarbonate.

The calcium sulphates are useful in controlling the life span, that is the time during which the cement mix maintains a sufficient workability, to enable laying of the mix before it hardens.

Preferable sources of calcium sulphate are dihydrate gypsum and natural anhydrites, fluo-gypsum or gypsum obtained from smoke desulphurization plants, and are added to the ground clinker in quantities generally between 0.1 and 20% of the total weight of the dried binder, and typically between 1% and 6%.

The total amount of sulphates in the binder according to the present invention must preferably satisfy the standard conditions ($SO_3$ content lower than 3,5%), and depends not only on the quantity added to the clinker in the form of gypsum or anhydrite, but also on the quantity of sulphates within the clinker itself.

Among the additives possibly added to the clinker, common cement should also be mentioned (as defined by the Standard UNI ENV 197.1), or Portland clinker; these products are added in quantities between 5% and 20% by weight with respect to the binder. In the event that Portland clinker is added, it may be added to the binder after having been ground, or can be ground together with the binder.

The cement or the Portland clinker, added to the binder of the invention, act synergistically with the calcium sulphate to regulate the setting time. In particular, the addition of cement or Portland clinker improves the mechanical resistance value and the mix workability at high temperatures.

The present invention further comprises a process for the preparation of the above mentioned hydraulic binder. According to this process, the hydraulic binder is prepared by adding to the clinker lime (preferably oxide lime clods), sodium aluminate, possibly sodium bicarbonate and possibly cement additives. All these components are ground together with the clinker until a mix is obtained that has the desired fineness. As an alternative, it is possible to pre-grind the lime, sodium aluminate, possibly sodium bicarbonate and possibly cement additives, and add the resulting mix to the previously ground clinker.

In a preferable aspect of the procedure of combined grinding mentioned above, the sodium aluminate is added in the form of a acqueous solution.

It is preferable to grind together the lime clods, aluminate and eventually bicarbonate with the clinker, in presence of dihydrate gypsum or anhydrite.

Grinding may be carried out by means of conventional equipment, such as horizontal ball mills with an open or closed loop and/or roller mills.

The thermal conditions of grinding and mixing are those typically used in the preparation of common cements.

To increase the efficiency of the grinding process, the normal additives used in grinding, and available on the market, can be used.

The fineness to which the mix of the components of the solid cement binder is ground generally between 2500 and 7000 Blaine, preferably between 4000 and 6000 Blaine ($cm^2/g$).

Grinding requires variable lengths of time, according to the characteristics of the crushing and grinding plants used, while laboratory mills require time lengths between 10 and 60 minutes, and typically between 30 and 40 minutes.

The total quantity of free CaO contained in the present hydraulic binder is typically between 1% and 10% in weight, and preferably between 3% and 6% by weight, with respect to the total weight of the solid binder, and depends primarily on the quantity added to the baked clinker, and in a limited measure, even on that contained in the clinker itself: this last portion of CaO is generally lower than 2.5% by weight with respect to the clinker.

The quantity of $Fe_2O_3$ in the binder is generally between 0,5% and 3% by weight of the total weight of the binder.

The hydraulic binder described above can be used to form quick-setting cement mixes by mixing it with water and other aggregates of various granulometric sizes. Such cement mixes, that are further object of the present invention, include the "pastes", (i.e. mixes of binders with water, without aggregates) and "conglomerates" (i.e. mixes of binders, water and inert additives).

The "inert additives" may be coarse aggregates, such as crushed stones or gravel, or fine aggregates, such as sand, and are classified according to the UNI 8520 Uni Standards.

Examples of conglomerates are: mortars (mixes of binders, water and fine aggregates), and concrete (mixes of water, binder, fine aggregates and coarse aggregates).

The mortars prepared with the binder of the invention have preferably a weight ratio of binder/aggregate between 2/1 and 1/3; the above stated ratio for concrete is between 1/3 and 1/6.

The quantity of water used in the cement composition is one sufficient to complete the hydration reaction of the binder and to provide for an optimum workability at the malleable state of the mix.

The proportion between water, binder and eventual aggregates of the cement composition according to the present invention may vary within wide ranges, and depends on the required properties and final use of the mortar and concrete. In general terms, the quantity of water is between about 15 and 60% by weight with respect to the weight of the binder.

The mixing method may be any conventional method. The temperature at which the binder is mixed with water and with any eventual aggregate, is generally between 5° C. and 35° C.

The invention further includes dry pre-mixes, which by being mixed with water form a quick-setting cement mix.

Such dry pre-mixes are made up of a homogeneous mix of the hydraulic binder mentioned above with one or more inert additives such as sand, and possibly other cement additives.

In a preferred embodiment, the dry pre-mixes contain, in addition to the binder object of the invention, all the other ingredients commonly used in forming mortars and concretes, with the exception of water: in the laying phase, the pre-mixes are combined with an appropriate amount of water, to obtain quick-setting mortars or concretes.

The cement mixes mentioned above, obtainable indifferently from the hydraulic binder or the dry pre-mix containing the same, can be used in all fields where it is desirable to work with cement materials that set rapidly. Examples of such applications are those where concretes are destined to applications in which it is important to reduce the forms removal time, the preparation of cement adhesives, the preparation of sprayable concretes, the preparation of floor foundations, the preparation of foundry moulds, locking up of dangerous toxic wastes (ex: asbestos). In the event that the above mentioned mixes are cast in forms in order to obtain various products, the reduced time for hardening permits to use the forms for a shorter period of time and consequently to shorten the industrial products production cycle.

The high setting speed permits certain operations to be effected quickly such as: laying of road manholes covers, fixing of steel brackets, plumbing pipes and hinges, the placement and/or fixing of wooden or metal frames, the laying of boxes and sheathing for electrical plants, the sealing of cement conduits, sewer or cisterns, blocking water infiltration, paving of road surfaces or landing lanes, the covering of roofs, and the manufacturing of concrete products.

Some of the applications mentioned above are illustrated in further detail below.

(i) Cement adhesives, containing the binder, object of the invention, mixed with cement (UNI EN 197-1), silica or limestone fillers, and additives capable of modifying the rheology of the mix and adhesion to the t substrates. Among these additives are thixotropic additives, such as cellulose ethers; superflluidizers, or fluidizers/water reducers, typically of melaminic, naphthalenic, or acrylic type; adhesives, typically of a vinylic type.

Cement adhesives can be used, for example, in laying of surface coverings and pavements, or as sealers for restoring elements damaged by water infiltration/humidity. The use of the present binder gives rapid setting characteristics to these products.

(ii) Floor foundations, containing the binder, object of the invention, mixed with Portland cement (UNI-ENV 197-1), filler, additives capable of compensating the shrinkage, and additives capable of modifying the rheology of the mix. The use of the present binder permits an accelerated formation and a rapid drying of the support base.

(iii) Materials for foundry moulds, containing the binder object of the present invention, mixed with sand. In foundry, the forms into which the compound is cast can be made from various material, for example a mix of sand and binder which is appropriately shaped into the desired form. Currently, the binders most widely used for this purpose are polyphenolic polymeric resins that use dimethylamine as a catalyst in the curing process. The use of such resins causes, nonetheless, serious environmental problems. The binder, according to the present invention, can be used as an alternative to the aforementioned resins in the formation of mixes suitable for the production of foundry moulds.

(iv) Sprayable mortars or concretes. The spraying of mortar or concrete is often used for lining of tunnels, slopes and slanting grounds. The spraying techniques are generally known as dry or wet methods. The dry method consists in the use of mixes of cement and aggregate mixes, with water being added to the nozzle during the spraying phase. The wet method consists in preparing the concrete mix and then spraying the same; in this case an accelerant additive is normally used during spraying phase. The binder, object of the present invention, can be used in the form of a binder in the dry method or can be added to a Portland cement (UNI-ENV 197-1) in the wet method. In the dry method the present binder is mixed with silica aggregates and/or limestone of different granulometric sizes. In the wet method the sprayable mix is obtained by mixing a Portland cement with the present binder, and possibly additives for concrete (fluidizers, etc.). The use of the present binder, in the wet method allows a significant reduction in the quantity of the accelerant additives added to the nozzle.

(v): Binders for toxic wastes: the binder of the present invention can be used to immobilize toxic wastes. Such a binder can be mixed with solid waste or be added to suspensions and/or water solutions containing toxic wastes. In the case of solidification of water suspensions containing asbestos fibers, the binder can be added with batches of 300–400 Kg/ton of suspension.

The use of the present binder, permits an high consolidation rate of the cement-waste mix, and therefore the precocious displacement of the consolidated masses. This property is particularly desired since the wastes often show a delaying effect upon hydration and hardening of the cement: in these cases the use of traditional cements causes a considerable delay in the wastes disposal cycle.

For illustrative purposes some non limiting examples of the present invention are shown below.

EXPERIMENTAL PART

EXAMPLE 1

Preparation of the Standard Binder

The preparation methods of the standard clinker, the same as those described in EP-A-819660, are as follows:

Baking of the clinker was effected in a rotary kiln that had a diameter of about 80 cm and length of 5 m.

The oven, lined with crushed refractory, and equipped with a methane gas burner fed with oxygen, is capable of reaching, in the baking zone, a temperature up to 1700–1800° C. The system used natural ventilation.

The hot gases, leaving the oven, pass in a masonry chamber above which is located a hopper made from perforated metal sheeting containing the granulated flour. The gasses pre-heat the flour and at the same time undergo a certain depulverization.

The feeding of the oven with the granules was done through a narrow channel with quadrangular sections.

Adjustments were possible with respect to the speed of rotation (from 30 a 90 sec/rev.) and methane flow-rate.

The temperature of the material being baked was detected by a high precision MINOLTA optical pyrometer.

The clinker discharged from the oven was dropped onto a metal chute which fed a small bucket elevator for subsequent deposition into a collection tank.

Given the limited flow of material, the cooling of the clinker occurred through simple exposure to the air.

The baking test was carried out in a manner, that in its complexity is satisfactory since it was possible to maintain baking stability conditions for quite prolonged periods of time.

Altogether, about 3 quintals of clinker were obtained in 4 hours. The clinkerization temperature, detected by the pyrometer, was 1330–1350° C.

An first portion of the clinker obtained in this way was mixed with "raw" lime (that is lime that has not undergone the baking process of the clinker), thus obtaining a reference standard binder. A second portion of clinker was mixed with raw lime and sodium aluminate, thus obtaining the binder of the present invention. The two binders thus obtained had the following compositions:

|  | Standard binder | Binder with aluminate |
|---|---|---|
| Clinker % | 93.7 | 93.5 |
| sodium aluminate % | — | 0.2 |

-continued

|  | Standard binder | Binder with aluminate |
|---|---|---|
| raw lime % | 4 | 4 |
| chemical gypsum % | 2.5 | 2.5 |

EXAMPLE 2

Effects of Sodium Aluminate (Tests in Mortar and in Paste)

The hardening times and resistance to compressive stress of cement compositions resulting from the standard binder and from the binder containing aluminate, both obtained in Example 1 were compared.

The tests were carried out in mortar and in paste. The mortar was obtained by mixing the binder with sand in a weight ratio equal to 1:1, and then blending the dry mix with about 20% of water. The pastes were obtained by mixing the binder with about 32% of water.

The results obtained for the mortars are shown in Table 1. The initial and final setting times are shown for the two compositions tested.

In the last two lines, the variations of initial and final setting times for each composition within the temperature range 5° C.–35° C. are emphasized.

TABLE 1 hardening times (Mortar)

|  | Standard | Aluminate | Difference (Std. – Alum.) |
|---|---|---|---|
| Initial setting (5° C.) | 4' 55" | 3' 05" | 1' 50" |
| Final setting (5° C.) | 5' 25" | 3' 25" | 2' 00" |
| Initial setting (20° C.) | 2' 00" | 1' 25" | 35" |
| Final setting (20° C.) | 2' 25" | 1' 35" | 50" |
| Initial setting (35° C.) | 1' 45" | 1' 25" | 20" |
| Final setting (35° C.) | 2' 40" | 1' 50" | 50" |
| Δ initial setting (5° C.–35° C.) | 3' 10" | 1' 40" |  |
| Δ final setting (5°–35° C.) | 2' 45" | 1' 35" |  |

Table 1 shows that the samples containing aluminate have a higher hardening rate as compared with the standard composition at low temperatures, as is shown in the third column.

The last two lines emphasize that, when passing from 35° C. to 5° C., the times of initial and final setting vary less in the case of mixes with added aluminate. This demonstrates the effect of the aluminate in stabilizing setting times at different laying temperatures.

Values of resistance to compressive stress (N/mm$^2$) at 20° C. of the two products are shown in the following table.

TABLE 2 resistance to compressive stress (PASTE)

|  | Standard (N/mm$^2$) | Aluminate (N/mm$^2$) |
|---|---|---|
| Resistance after 15' | 4.4 | 6.2 |
| Resistance after 1 h | 7.0 | 7.7 |
| Resistance after 3 h | 7.4 | 9.0 |
| Resistance after 24 h | 14.0 | 14.5 |
| Resistance after 3 days | 16.3 | 17.4 |

TABLE 2-continued resistance to compressive stress (PASTE)

|  | Standard (N/mm$^2$) | Aluminate (N/mm$^2$) |
|---|---|---|
| Resistance after 7 days | 20.1 | 21.2 |
| Resistance after 28 days | 33.9 | 33.4 |

Similar to what is shown in table 1, table 3 shows the results obtained with pastes.

TABLE 3 hardening times (PASTE)

|  | Standard | Aluminate | Δ Stand./Alum. |
|---|---|---|---|
| Initial setting (5° C.) | 4' 30" | 1' 55" | 2' 35" |
| Final setting (5° C.) | 5' 30" | 2' 20" | 3' 10" |
| Initial setting (20° C.) | 1' 50" | 1' 32" | 18" |
| Final setting (20° C.) | 2' 30" | 2' 08" | 22" |
| Initial setting (30° C.) | 1.40 | 1' 38" | 2" |
| Final setting (30° C.) | 2.20 | 2' 12" | 8" |
| Δ initial setting (5°–30° C.) | 2' 50" | 17" |  |
| Δ final setting (5°–30° C.) | 3' 10" | 8" |  |

In this case too, the sample containing aluminate demonstrates a higher setting time stability at different temperature.

EXAMPLE 3

Effect of Different Sodium Aluminate Doses

The composition of Example 1 was compared with different binders containing the same clinker with the same composition, but having in addition, different percentages of sodium aluminate.

These binders were used to produce mortars by mixture with sand in a weight ratio equal to 1:1, and blending the product with about 17% of water.

The results are shown in the following table:

TABLE 4 hardening times (MORTAR)

|  | Aluminate. 0.15% | Aluminate. 0.20% | Aluminate. 0.25% |
|---|---|---|---|
| Initial setting (5° C.) | 2' 50" | 2' 15" | 1' 50" |
| Final setting (5° C.) | 3' 40" | 2' 50" | 2' 30" |
| Initial setting (20° C.) | 1' 10" | 1' 05" | 1' 30" |
| Final setting (20° C.) | 1' 45" | 1' 40" | 2' 10" |
| Δ initial setting (20°–5° C.) | 1' 40" | 1' 10" | 20" |
| Δ final setting (20°–5° C.) | 1' 55" | 1' 10" | 20" |

The last two lines show that, when passing from 20° C. to 5° C., the initial and final setting times vary less in the case of the compositions with a higher quantity of aluminate. Thus the effects of stabilization in the setting times increase, proportionately with the increased quantity of sodium aluminate added.

In the case of the sample containing a percentage of aluminate equal to 0.25%, the variation (20 seconds) results to be practically negligible: thus, a cement is obtained whose setting rate, besides being elevated, is practically independent from the laying temperature.

EXAMPLE 4

Effects of the Addition of Bicarbonate

The effects of sodium aluminate and sodium bicarbonate added to a standard quick-binder containing a fluoroaluminate based clinker baked through the use of coal, and supplemented with "raw" lime (4%) and chemical gypsum (2.5%) were tested.

Mortars were obtained by mixing the standard quick-binder with sand in proportions of 1:1, and mixing the product with about 17% of water: The setting times of the mortar are shown in the following table:

TABLE 5 hardening times (MORTAR)

|  | Standard | Alum (0.2%) | Bicarb. (0.4%) | Alum. (0.2%) Bicarb. (0.4%) |
|---|---|---|---|---|
| Initial setting (5° C.) | 5' 05" | 3' 30" | 4' 15" | 2' 40" |
| Final setting (5° C.) | 6' 15" | 4' 05" | 5' 15" | 3' 30" |
| Initial setting (20° C.) | 2' 10" | 1' 30" | 2' 00" | 1' 40" |
| Final setting (20° C.) | 2' 35" | 1' 40" | 2' 20" | 2' 00" |
| Δ initial setting (20°–5° C.) | 2' 55" | 2' 00" | 2' 15" | 1' 00" |
| Δ final setting (20°–5° C.) | 3' 40" | 2' 25" | 2' 55" | 1' 30" |

Data shown in Table 5 confirm the stabilization effect of sodium aluminate on setting times at different temperature.

Moreover, the addition of bicarbonate synergistically amplifies this effect, significantly reducing changes to the initial and final setting time at different temperature ranges, not only as compared with the standard binder, but also as compared with the sample containing aluminate.

The effect of the association of sodium aluminate and sodium bicarbonate was further studied in relation to resistance to compressive stress ($N/mm^2$) of the mortar in time spans between 15' and 3 days.

The compressive stress tests were carried out at 5° C. The results are shown in the following Table:

TABLE 6 resistance to compressive stress (MORTAR)

|  | Alum (0.2%) | Alum. (0.2%) + Bicarb. (0.4%) |
|---|---|---|
| Resistance after 15' | 7.8 | 9.4 |
| Resistance after 1 h | 8.4 | 11.4 |
| Resistance after 3 h | 9.5 | 12.3 |
| Resistance after 24 h | 15.5 | 19.4 |
| Resistance after 3 days | 22.1 | 25.1 |
| Resistance after 7 days | 23.8 | 25.5 |
| Resistance after 28 days | 32.3 | 38.3 |

The data in table 6 demonstrate that the association of sodium bicarbonate and sodium aluminate, in addition to reducing the setting times (Tab. 4), preserves the values of mechanical resistance of the mixes after laying. It is therefore possible, through the association of bicarbonate, object of the present invention, to obtain quick-setting cements with high setting rate even at low temperatures, with fewer variations in the setting times under temperature variations, and that at the same time maintain elevated mechanical resistance values after laying.

EXAMPLE 5

Effect of Adding Common Cement

Experiments were carried out to assess the effect of the addition of ordinary cement on the resistance to compressive stress of the binder supplemented with sodium aluminate.

The resistance values were determined at temperatures of 20° C. and 30° C. for pastes containing the binder mixed with a quantity of composite Portland cement in a granulated slag (CEM II A-S 42.5 R) equal to 5%, 10% and 15%. Similar tests were carried out using, in place of granulated slag cement, pozzuolana cement (CEM IV A 32.5). The results are shown in Table 7.

TABLE 7

|  | Temperature | |
|---|---|---|
|  | 20° C. | 30° C. |
| 100% BINDER | | |
| % of water in the mix | 35.0 | 36.0 |
| Resistance to compressive stress. N/mm2 | 5.13 | 3.35 |
| 15 minutes | 6.47 | 4.18 |
| 1 hour | 7.03 | 4.78 |
| 3 hours | 13.76 | 12.80 |
| 7 days | 20.82 | 21.92 |
| 28 days | 27.40 | 25.94 |
| 95% BINDER 5% CEM II/A-S 42.5 R | | |
| % of water in the mix | 34.0 | 38.0 |
| Resistance to compressive stress. N/mm2 | 5.63 | 4.43 |
| 15 minutes | 6.36 | 4.97 |
| 1 hour | 6.92 | 5.06 |
| 3 hours | 13.47 | 12.58 |
| 1 day | 21.19 | 22.72 |
| 7 days | 28.23 | 27.50 |
| 28 days | | |
| 90% BINDER 10% CEM II/A-S 42.5 R | | |
| % of water in the mix | 33.0 | 37.0 |
| Resistance to compressive stress. N/mm2 | 5.19 | 4.44 |
| 15 minutes | 6.78 | 5.61 |
| 1 hour | 7.94 | 6.20 |
| 3 hours | 17.47 | 14.80 |
| 1 day | 27.53 | 24.18 |
| 7 days | 34.15 | 28.94 |
| 28 days | | |
| 85% BINDER 15% CEM II/A-S 42.5 R | | |
| % of water in the mix | 32.0 | 36.0 |
| Resistance to compressive stress. N/mm2 | 6.76 | 4.90 |
| 15 minutes | 7.48 | 5.15 |
| 1 hour | 8.45 | 6.20 |
| 3 hours | 19.93 | 16.21 |
| 1 day | 30.45 | 26.92 |
| 7 days | 37.30 | 28.77 |
| 28 days | | |
| 95% BINDER - 5% CEM IV/A 32.5 | | |
| % of water in the mix | 34.0 | 38.0 |
| Resistance to compressive stress. N/mm2 | 5.47 | 4.60 |
| 15 minutes | 6.23 | 4.92 |
| 1 hour | 7.43 | 4.99 |
| 3 hours | 14.79 | 13.49 |
| 1 day | 22.38 | 18.03 |
| 7 days | 30.84 | 27.75 |
| 28 days | | |
| 90% BINDER - 10% CEM IV/A 32.5 | | |
| % of water in the mix | 33.0 | 37.0 |
| Resistance to compressive stress. N/mm2 | 5.84 | 4.51 |
| 15 minutes | 6.96 | 6.05 |
| 1 hour | 7.82 | 6.07 |
| 3 hours | 16.10 | 14.07 |

TABLE 7-continued

|  | Temperature | |
| --- | --- | --- |
|  | 20° C. | 30° C. |
| 1 day | 24.99 | 22.17 |
| 7 days | 31.02 | 27.51 |
| 28 days | | |
| 85% BINDER - 15% CEM IV/A 32.5 | | |
| % of water in the mix | 32.0 | 36.0 |
| Resistance to compressive stress. N/mm2 | 6.30 | 4.97 |
| 15 minutes | 7.48 | 5.85 |
| 1 hour | 8.95 | 6.15 |
| 3 hours | 18.01 | 16.98 |
| 1 day | 28.50 | 26.67 |
| 7 days | 38.60 | 30.97 |
| 28 days | | |

It can be seen that the addition of cement significantly improves the mechanical strength values. The addition of cement also improves the workability characteristics of the mixes at high temperatures.

EXAMPLE 6

Concrete for Quick Repairs

A concrete for quick repairs was obtained with the binder of the present invention. The mix was stirred for 30'. The composition of the concrete, thus obtained, is the following:

| | |
| --- | --- |
| Binder | 450 Kg/cm$^3$ |
| Siliceous aggregate (max. diameter 10 mm) | 1800 Kg/cm$^3$ |
| Superflux AC 2000 | 1.5% |
| Citric acid | 0.5% |
| Anhydrite | 3% |
| The rheologic mechanical properties are the following: | |
| water/cement ratio | 0.40 |
| conical breakdown | 110 mm |
| volumetric mass | 2412 Kg/cm$^3$ |
| resistance to compressive stress | |
| 2 h | 4.0 N/mm$^2$ |
| 3 h | 8.9 N/mm$^2$ |
| 24 h | 23.5 N/mm$^2$ |
| 2 d | 29.5 N/mm$^2$ |
| 7 d | 38.8 N/mm$^2$ |
| 28 d | 48.2 N/mm$^2$ |
| 90 d | 52.0 N/mm$^2$ |

EXAMPLE 7

Floor Foundation

A floor foundation was obtained with the binder, object of the present invention. The composition of the foundation is the following:

| | |
| --- | --- |
| binder | 6% |
| CEM II/A-L42.5 | 13.2% |
| Melment F 10 | 0.2% |
| Anhydrite | 0.6% |
| Siliceous aggregate (d $\leq$ 6 mm) | 80% |

The rheological and mechanical properties are the following:

| | |
| --- | --- |
| water/cement ratio | 0.48 |
| conical breakdown, mm | undeterminable |
| type of consistency | "moist clay" |
| workability limits, min | 40–60 |
| Humidity residual after | |
| 24 h: | 3.5% |
| 3 d: | 1.6% |
| 7 d: | 1.0% |
| 28 d: | 0.5% |

| Resistance to compressive stress | | Contraction |
| --- | --- | --- |
| 5 h | 3.1 N/mm$^2$ | |
| 8 h | 4.0 N/mm$^2$ | |
| 24 h | 14 N/mm$^2$ | 0.01% |
| 2 d | | 0.01% |
| 3 d | 45 N/mm$^2$ | |
| 7 d | 50 N/mm$^2$ | 0.03% |
| 14 d | | 0.06% |
| 28 d | 60 N/mm$^2$ | 0.06% |

EXAMPLE 8

Quick-setting Cement Adhesive

A quick-setting cement adhesive was obtained by using the binder of the present invention. The composition is the following:

| | |
| --- | --- |
| Binder | 12% |
| CEM II/A-L42.5 R | 25% |
| Siliceous filler (0.02–0.55 mm) | 20% |
| Calcareous filler (0.02–0.65 mm) | 40.5% |
| methylcellulose | 0.4% |
| Vinnapas resin | 2% |
| Melment F-10 | 0.1% |

The physical-mechanical characteristics are the following:

| | |
| --- | --- |
| % of water in the mix | 28% |
| initial setting | 1 h 02' |
| final setting | 2 h 06' |
| resistance to compressive stress | |
| 2 h | 0.5 N/mm$^2$ |
| 7 d | 5.6 N/mm$^2$ |
| 28 d | 6.8 N/mm$^2$ |

EXAMPLE 9

Rapidly Unmoldable Concrete

U-shape conduits (0.6×0.65 m; thickness 0.15 m; length 2.5 m) were made for pouring concrete, containing the binder according to the present invention into the appropriate forms. In addition to the binder, the concrete also contained cement CEM II A-L 32.5 R, siliceous aggregate (diameter $\leq$18 mm), and superfluidifying retardant additives. Cement content: 300 Kg/m3. Water/cement ratio: 0.5. The unmolding time resulted to be 1 hour. The product was ready for delivery after 72 hours. In these conditions, the plant completed 4 production cycles daily instead of 2, using half of the forms, and reducing product stocking times prior to delivery.

EXAMPLE 10

Immobilization of Asbestos

A water mix containing 15% of asbestos (dust and fiber) was treated with the binder, object of the present invention, in the proportion of 360 Kg binder/ton of water mix. The initial setting time was 20'. The final setting time was 30'. The resistance to compressive stress after 3 days resulted to be 3.2 MPa. The solidified mix was crushed until particles were obtained with diameters below 5 mm. After leaching, and successive IR analysis of the filtrate it was ascertained that the particles did not release any asbestos fibers.

EXAMPLE 11

Materials for Foundry Moulds (Cylinders)

The binder, object of the present invention (10%), was mixed with sand (90%) and a ratio of water/cement equal to 0.5. To facilitate the formation of the moulds, lignin sulfonate dissolved in the mixing water was added at 0.1% in weight as compared with the cement. The mix showed a setting time, measured with a Vicat needle, of 15'–20'.

The final resistance to compressive stress of the material was compared with that of similar forms prepared by substituting the binder of the invention with a traditional binder (sodium silicate). The physical-mechanical results obtained are the following:

TABLE 8

| | Binder with Sodium allumiate | Sodium silicate (compar.) |
|---|---|---|
| Resistance to compressive stress (N/mm$^2$) | | |
| | 0.4 | 0.4 |
| 24 h | 1.1 | |
| 3 d | 1.1 | |
| 7 d | 1.8 | |
| 28 d | 2.1 | 1.6 |

The mechanical strength, the values of permeability to gas, and of gases evolution of moulds for cylinder parts of rolling mills or cast iron ingot moulds allow to carried out the casting without inconveniences, thus obtaining products without defects and with good mechanical characteristics.

EXAMPLE 12

Cores for Melting Components for Automotive Industry

The binder of the present invention (13.5%) was mixed with sand (85%), and anhydrite (1.5%). A 6% of water was added to the resulting mix. The material, thus obtained, was used to make cores for melting of automotive industry components. The flexural resistance determined on standard test pieces (25×25×200 mm) of sand consolidated with cement was:

10' 0.71 N/mm$^2$ 1 h 0.93 N/mm$^2$ 3 h 1.40 N/mm$^2$ 48 h 2.40 N/mm$^2$

EXAMPLE 13

SPRAYED CONCRETE

TEST 1

Compositions of sprayable concrete were obtained by using cement CEM III A 42.5 and the binder, object of the present invention in the following proportions:

| A: | binder 5% | CEM III A 42.5: 95% |
|---|---|---|
| B: | binder 15% | CEM III A 42.5: 85% |

The standard binder (sodium silicate with molar ratio silica/Na$_2$O=3.5) was added to these mixes in the quantities of 5%, 10% or 15%.

Reference compositions were made, identical to those described but without the binder according to the present invention.

Figure 1A:
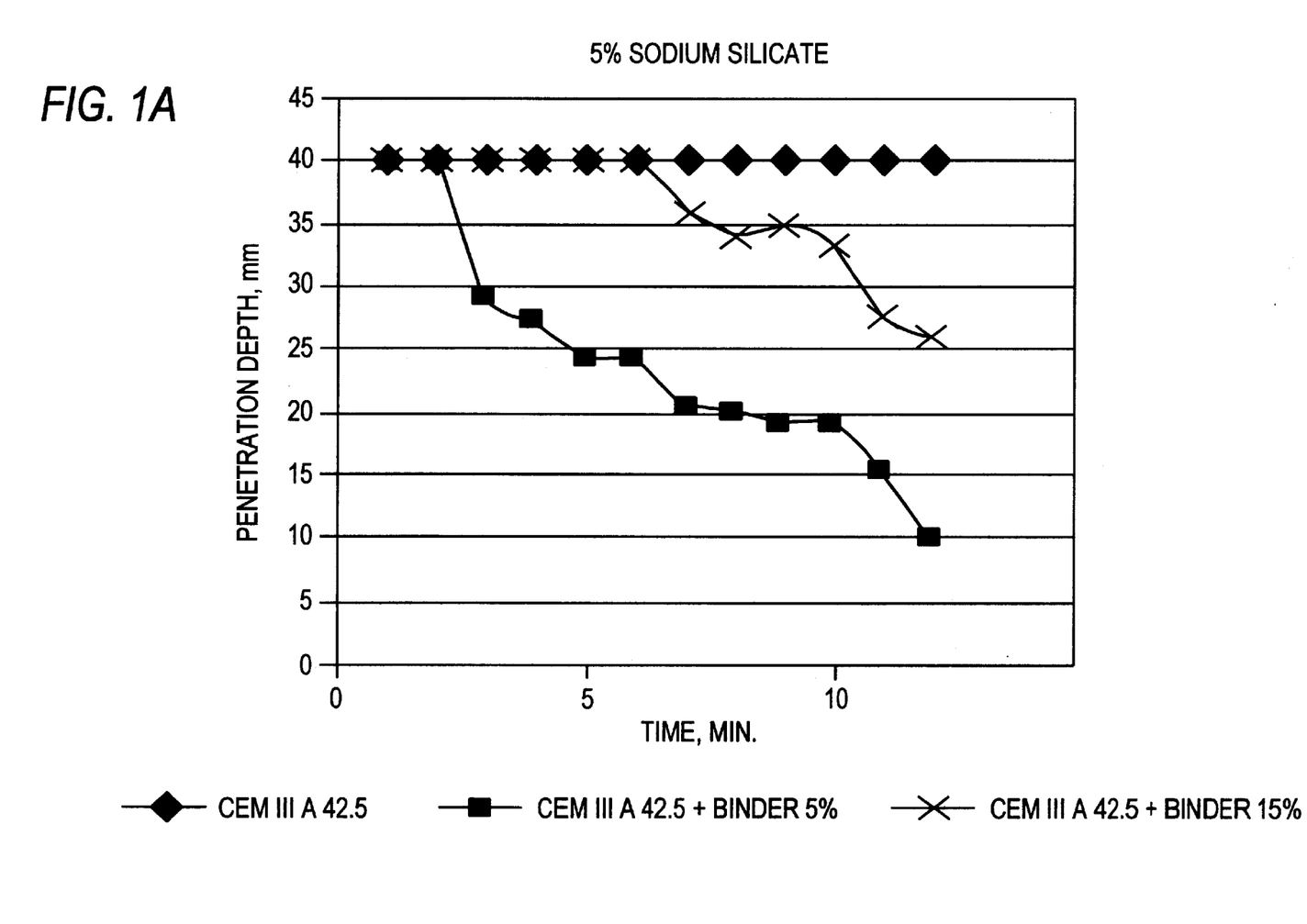
Figure 1B:
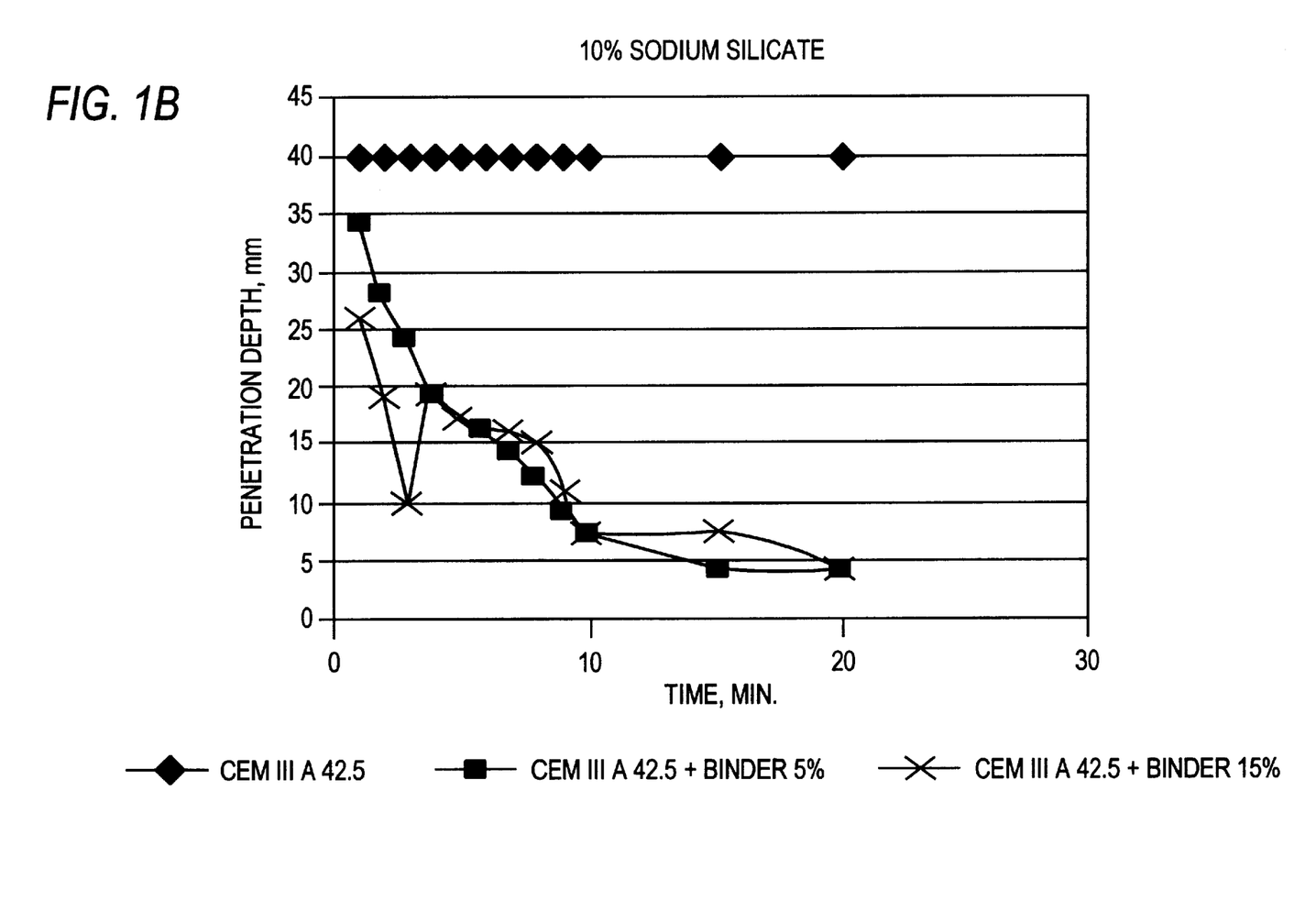
Figure 1C:
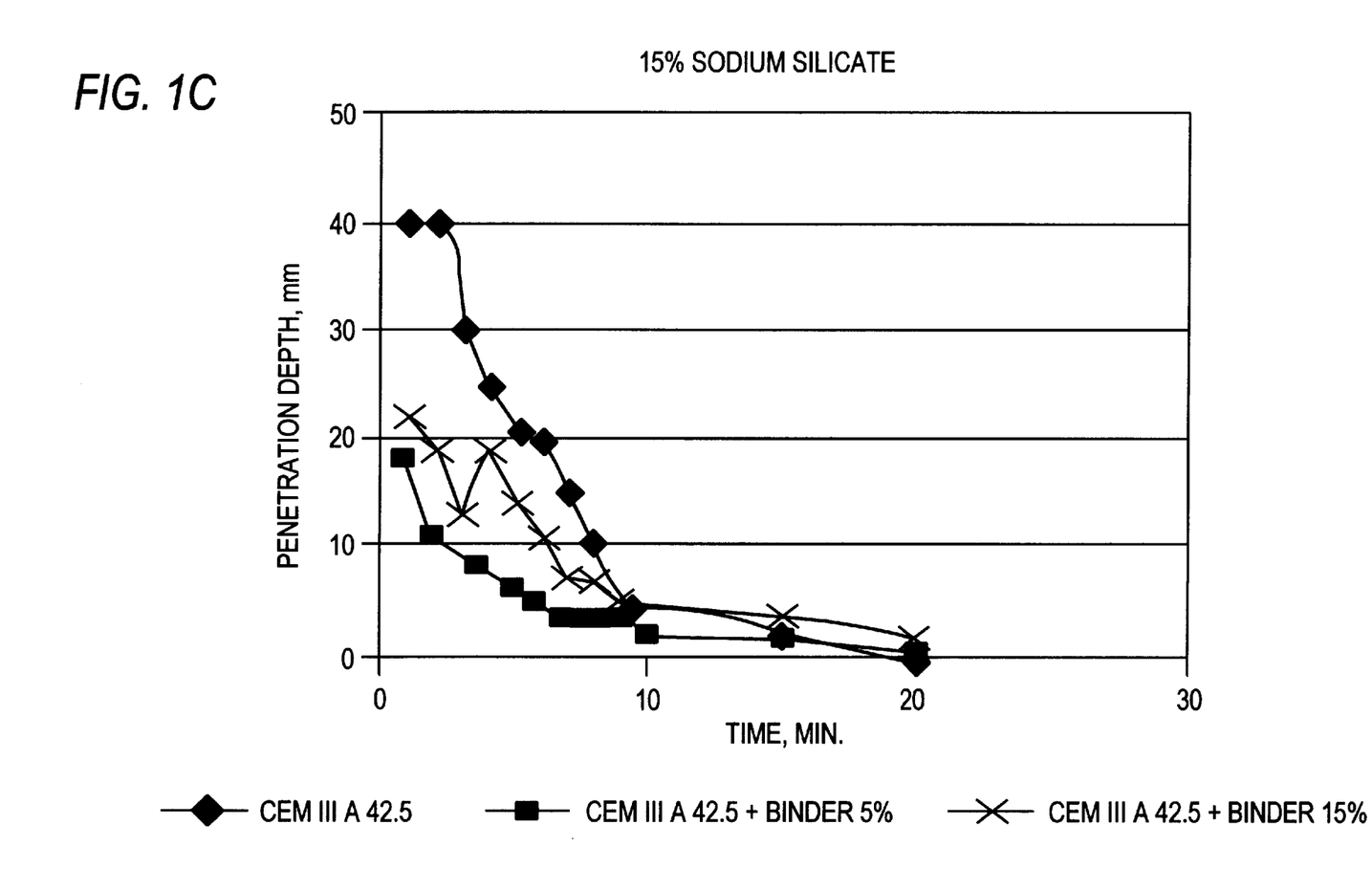

All compositions were submitted to the setting tests (UNI-EN 196-3). The results obtained are shown in FIG. 1.

All samples containing the binder, object of the present invention, exhibited a dramatic reduction in the penetration depth of the Vicat needle, thus indicating a much quicker hardening.

These data show that, with constant amounts of alkaline accelerant (silicate) being present, the addition of the binder object of the present invention considerably increases the hardening speed of the sprayable concretes. This permits, therefore, to reduce the use of conventional alkaline accelerants, without interfering with the setting rate.

TEST 2

Sprayable concrete mixes were obtained using cement CEM III A 32.5 R and the binder, object of the invention in the following proportions:

| A: | binder 10% | CEM III A 32.5 R: 90% |
|---|---|---|
| B: | binder 25% | CEM III A 32.5 R: 75% |

These compositions were supplemented with a non-alkaline additive (Gecedral F 200) in the proportions of 5%, 10% or 15%.

Reference compositions were made, identical to those described, but without the binder of the invention.

Figure 2A:
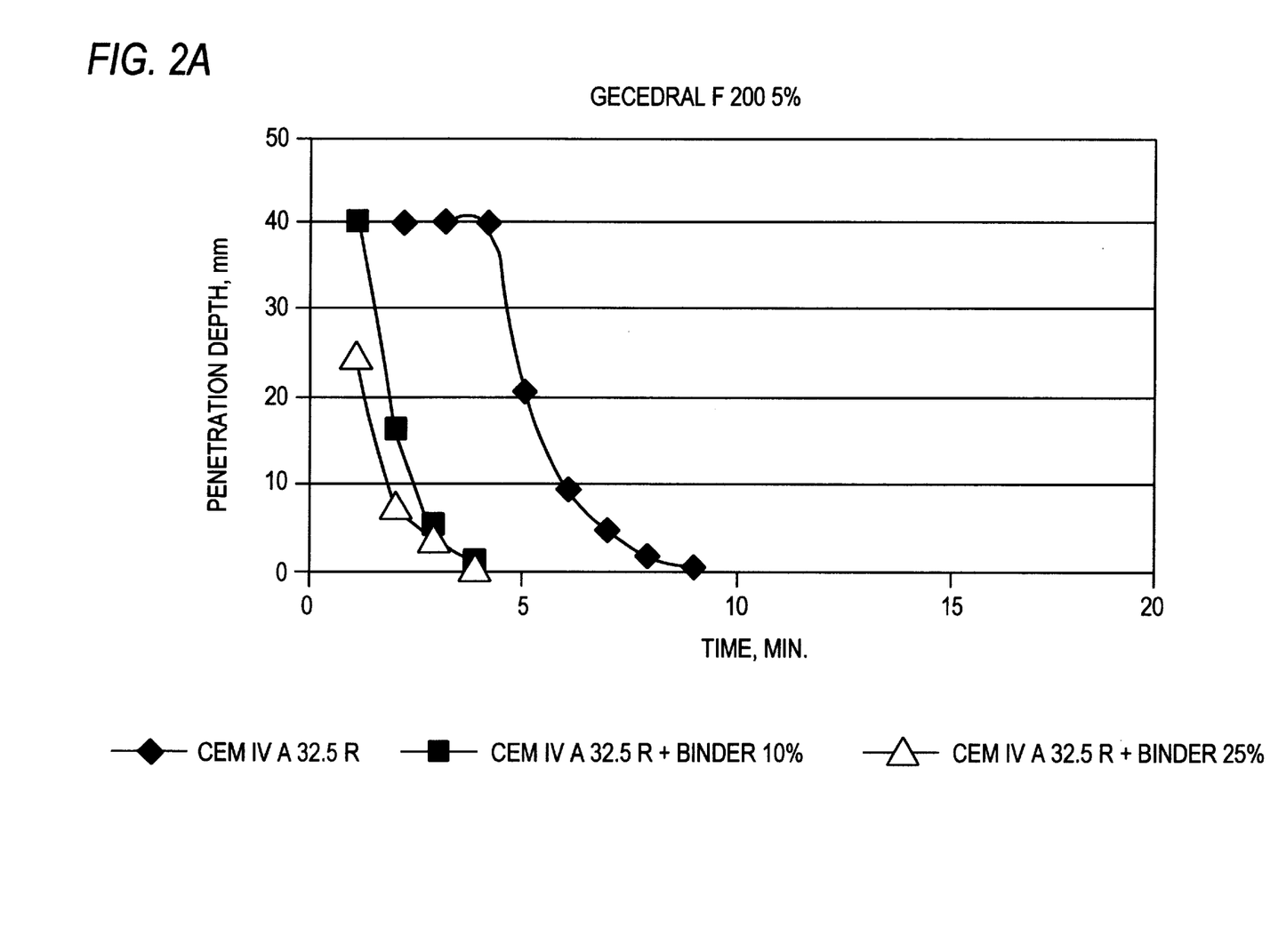
Figure 2B:
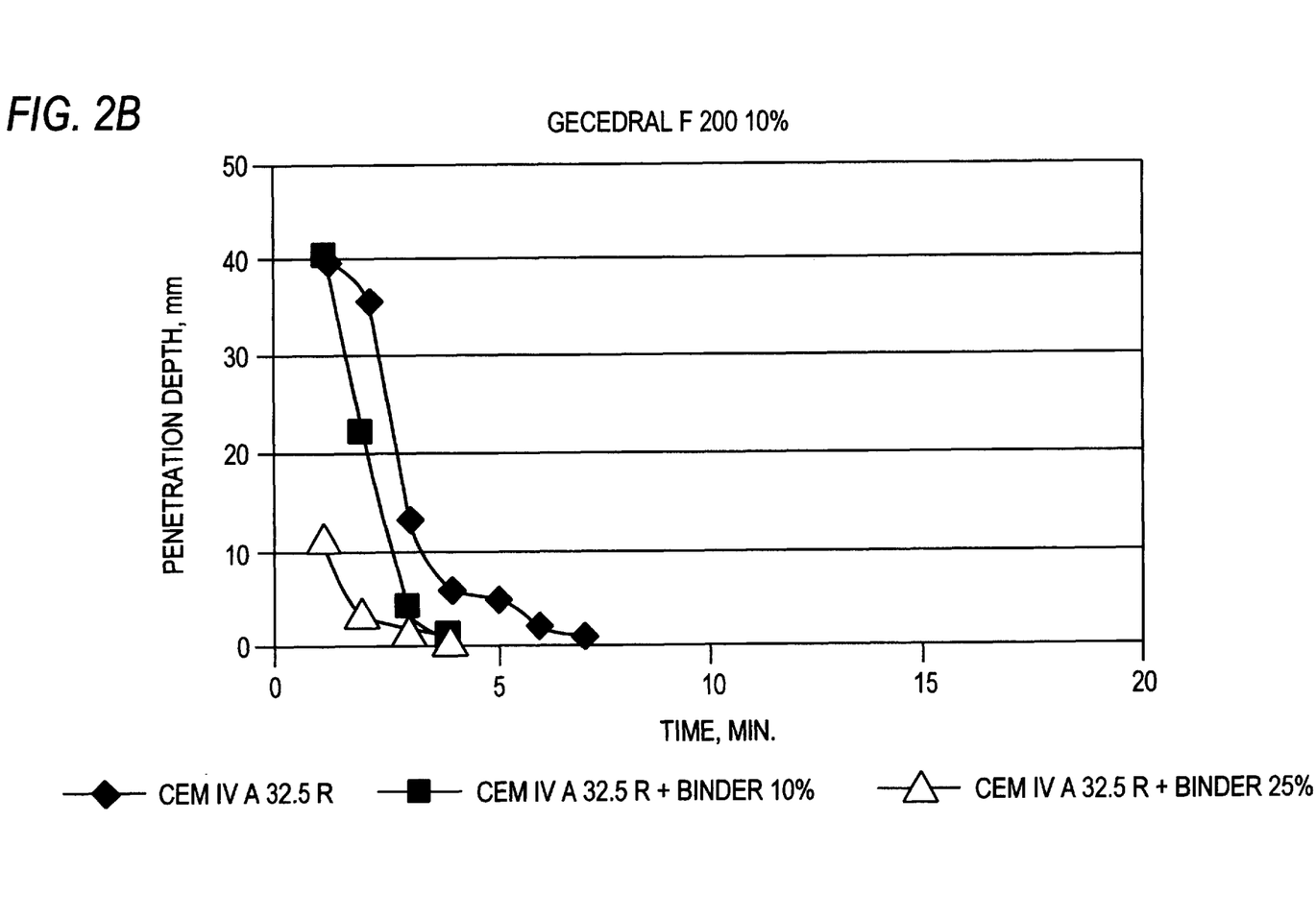
Figure 2C:
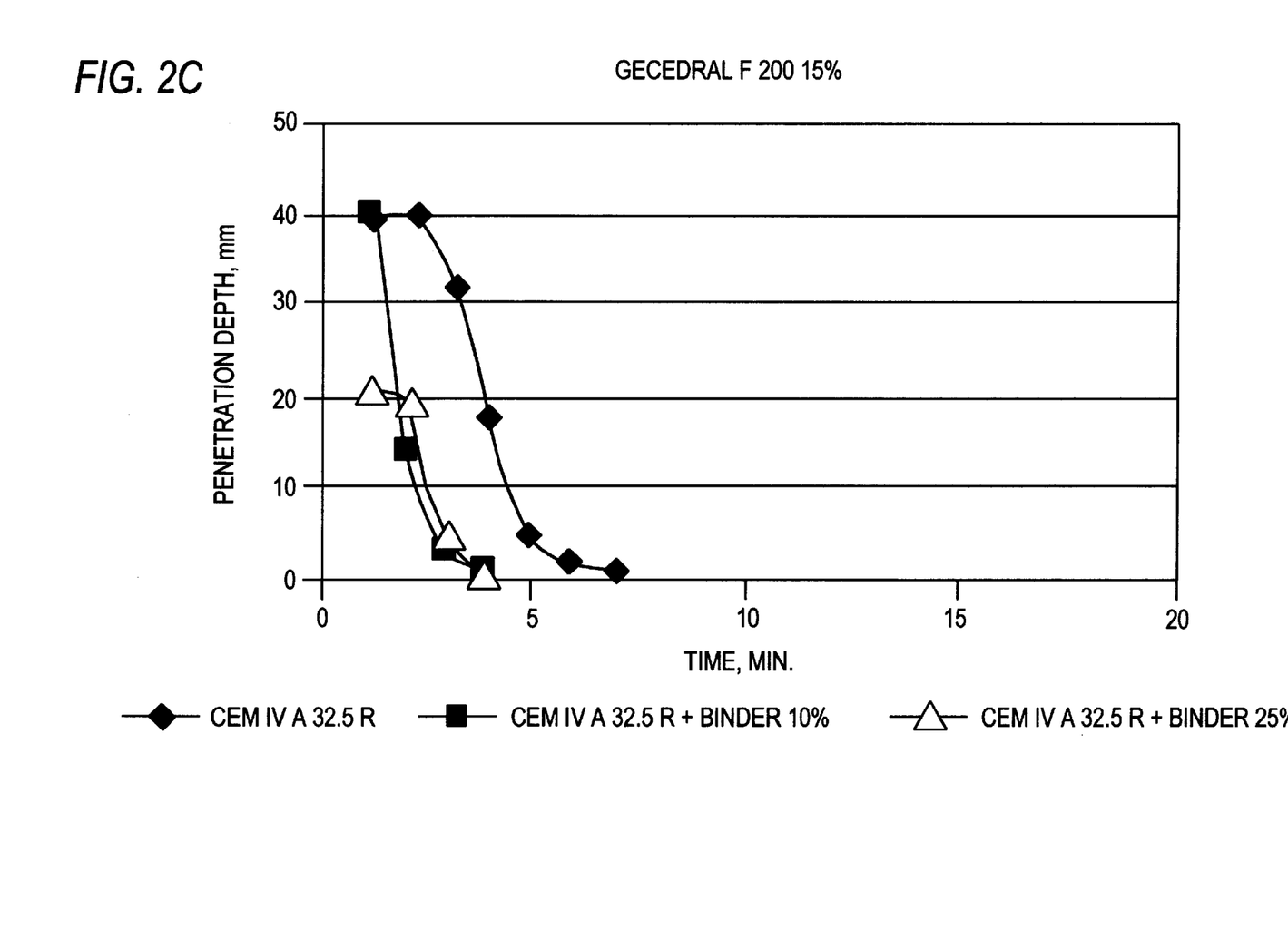

All compositions were submitted to the setting tests. The results shown in FIG. 2 confirm the conclusions shown for test 1.

What is claimed is:

1. An hydraulic binder for cement compositions comprising: (a) a clinker, obtained by a baking process, comprising calcium fluoroaluminate ($C_{11}A_7f$), (b) sodium aluminate in quantities between 0.01% and 0.5% by weight with the respect to the weight of the binder and (c) lime added to the clinker after the baking process thereof.

2. Hydraulic binder according to claim 1, wherein said clinker is present in quantities equal to at least 70% by weight with respect to the weight of the binder.

3. Hydraulic binder according to claim 1, wherein said clinker is present in quantities equal to at least 93% by weight with respect to the weight of the binder.

4. Hydraulic binder according to claim 1, wherein sodium aluminate is added to the clinker in quantities equal to 0.25% by weight with the respect to the weight of the binder.

5. Hydraulic binder according to claim 1, wherein the lime is added to the clinker in quantities between 1% and 8% by weight with respect to the weight of the binder.

6. Hydraulic binder according to claim 5, wherein the lime is added to the clinker in quantities between 3% and 6% by weight with the respect to the weight of the binder.

7. Hydraulic binder according to claim 6, wherein the lime is added to the clinker in quantities between 4% by weight with the respect to the weight of the binder.

8. Hydraulic binder according to claim 1, wherein the lime is calcium oxide in powder or clods.

9. The hydraulic binder according to claim 1, wherein said clinker comprising $C_{11}A_7f$ further comprises $C_3S$, $C_2S$, and $C_4AF$.

10. Hydraulic binder according to claim 1, further comprising sodium bicarbonate added to said clinker, lime and sodium aluminate.

11. Hydraulic binder according to claim 10, wherein the sodium bicarbonate is added in quantities from 0.1% to 1% by weight with respect to the weight of the binder.

12. Hydraulic binder according to claim 11, wherein the sodium bicarbonate is added in quantities equal to 0.4% by weight with respect to the total weight of binder.

13. Hydraulic binder according to claim 1, further comprising common cement (UNI-ENV 197-1) or Portland clinker in quantities from 5% and 20% by weight with respect to the weight of the binder.

14. Process for preparation of the hydraulic binder according to claim 1, wherein said lime, sodium aluminate and clinker are ground simultaneously.

15. Process for the preparation of the hydraulic binder according to claim 1, wherein said lime, sodium aluminate and clinker are ground separately and said lime and said sodium aluminate are added successively to said clinker.

16. Process according to claim 14, where said sodium aluminate is added in the form of a water solution.

17. Dry pre-mix for cement compositions containing the hydraulic binder according to claim 1, and one or more inert additives, and optionally other cement additives.

18. A mixture comprising the hydraulic binder according to claim 1, water and, optionally, aggregates.

19. Mortar comprising the mixture according to claim 18 and fine aggregates.

20. Concrete comprising the mixture according to claim 18, fine aggregates and coarse aggregates.

21. Concrete paste comprising the hydraulic binder according to claim 1 and water without aggregates.

22. A process for the preparation of quick-setting cement mixes comprising mixing the hydraulic binder according to claim 1 with water.

23. Process for the preparation of concrete products, cement products, cement adhesives, subsurfaces for pavement, quick-setting mortar and concrete, sprayable mortar and concrete, materials for foundry moulds, mixes for the immobilization of volatile wastes, said process comprising the step of mixing the hydraulic binder according to claim 1 with water.

24. Process for the placing of road manhole covers, fixing steel brackets, plumbing pipes and hinges, laying and attachment of wooden and metal frames, laying of boxes and sheathing for electrical installations, sealing of cement conduits, sewer and cisterns, blocking of water infiltration, re-paving of road surfaces or airstrips, covering of roofs, mortar or concrete spraying in tunnels, lining of slopes and slanting grounds, and in the preparation of concrete products, said process comprising the step of mixing the hydraulic binder according to claim 1 with water.

25. A process for the preparation of hydraulic binder according to claim 10 wherein lime, sodium aluminate, clinker and sodium bicarbonate are ground simultaneously with the clinker.

26. A process for the preparation of hydraulic binder according to claim 10 wherein lime, sodium aluminate, clinker and sodium bicarbonate are ground separately and added successively with the clinker.

27. The hydraulic binder according to claim 9, wherein said clinker comprises from 12% to 18% by weight of $C_{11}A_7f$, from 40% to 45% by weight of $C_3S$, from 25% to 30% by weight of $C_2S$, and from 6% to 8% by weight of $C_4AF$.

* * * * *